Figure 1:
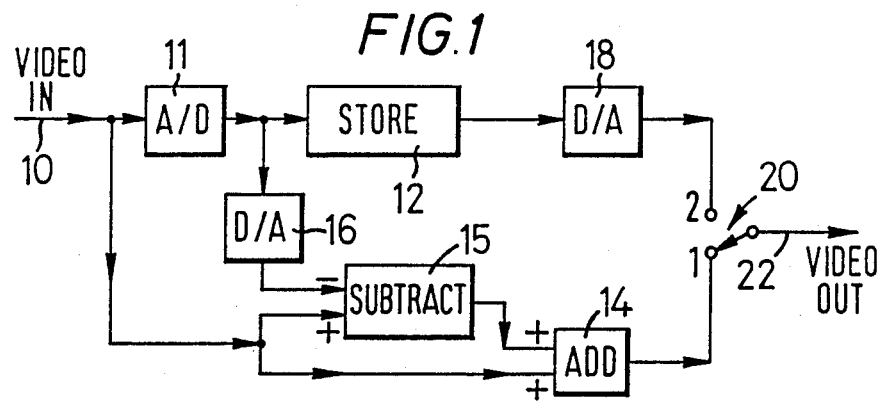

United States Patent [19]

Hipwell

[11] Patent Number: 4,928,178

[45] Date of Patent: May 22, 1990

[54] CONTROL OF VISUAL DISPLAY UNITS

[75] Inventor: William E. H. Hipwell, Elstree, England

[73] Assignee: Eastman Kodak Company, Rochester, N.Y.

[21] Appl. No.: 322,135

[22] Filed: Mar. 13, 1989

[30] Foreign Application Priority Data

Apr. 7, 1988 [GB] United Kingdom ............... 8808082

[51] Int. Cl.[5] .............................................. H04N 5/14
[52] U.S. Cl. ..................................... 358/160; 358/909
[58] Field of Search ..................... 358/160, 909, 21 R

[56] References Cited

U.S. PATENT DOCUMENTS 4,792,863 12/1988 Urabe ................................. 358/909

OTHER PUBLICATIONS

"Hybrid-pulse coding: theoretical assessment of system"; BBC Research Department; No. 1969/40; Oct. 1969.
"Hybrid-pulse coding: experimental assessment of system as applied to video signals"; BBC Research Department; No. 1969/45; Nov. 1969.
"Hybrid-pulse coding; experimental equipment for tests with video signals"; BBC Research Department; No. 1969/46; Nov. 1969.

*Primary Examiner*—John W. Shepperd
*Assistant Examiner*—Michael D. Parker
*Attorney, Agent, or Firm*—David M. Woods

[57] ABSTRACT

Apparatus for controlling a visual display unit from a video signal which is present for a first period of time such that an image corresponding to the signal can be displayed for one or more further such periods. The apparatus stores a digital representation of the video signal which is used to enable the required image to persist for the one or more further periods. The apparatus also generates during the first period a correction signal which is combined with the video signal and used to compensate for any imprecision in the stored signal. This arrangement permits the use of relatively small storage devices and relatively simple analogue-to-digital converters.

5 Claims, 2 Drawing Sheets

CONTROL OF VISUAL DISPLAY UNITS

This invention relates to visual display units of the type in which picture information can be stored for periods of time longer than that associated with the video signal representing the information.

The displays of visual display units are usually driven by video signals. Such video signals are present for a given period of time and the displayed image associated with a video signal normally exists for a corresponding period. It is known to provide a store or stores for storing video signals such that a given image can be displayed for longer periods of time. This may be necessary, for example, when it is required to photograph the image and the photographic material needs an exposure time which is longer than the period for which the video signal exists. In such arrangements the display can be driven from the stored signal to effectively repeat the image for one or more further such periods. In displays of this type it is necessary that the signal read from the store during the one or more further periods be a faithful reproduction of that of the first period. Particularly in the case of digital storage, each picture element must be measured with great accuracy and many bits per element are required to achieve the necessary high precision. Thus large and expensive stores have to be employed and it is sometimes necessary to compromise between speed and accuracy.

According to a first aspect of the present invention there is provided apparatus for controlling operation of a visual display unit from a video signal which is present only during a first period of time, such that an image corresponding to that signal can be displayed for one or more further such periods, said apparatus comprising storage means for storing digital signals representative of picture information to be displayed for one or more periods after that first period, and means for generating during the first period a correction signal which is arranged to compensate for any imprecision in the stored signal and which is combined with the video signal so that the display is driven by the combined signal in the first period.

The video signal may be in analogue form and can be fed to the storage means by an analogue-to-digital converter. The means for generating the correction signal may comprise a subtraction circuit which forms a signal representing the difference between the video signal and the analogue equivalent of the stored signal. The correction signal and the video signal may be combined in an addition circuit.

According to another aspect of the present invention there is provided a method of operating a visual display unit so that an image can be displayed for a period of time longer than that associated with the period for which the corresponding video signal normally exists, comprising storing a digital version of the video signal to be displayed, forming during a first period a correction signal which is arranged to compensate for imprecisions in the stored signal combining the correction signal with the video signal and driving the display on the basis of the combined signal during said first period and on the basis of the stored signal during one or more further periods.

The invention will be described now by way of example only, with particular reference to the accompanying drawings.

Figure 3:
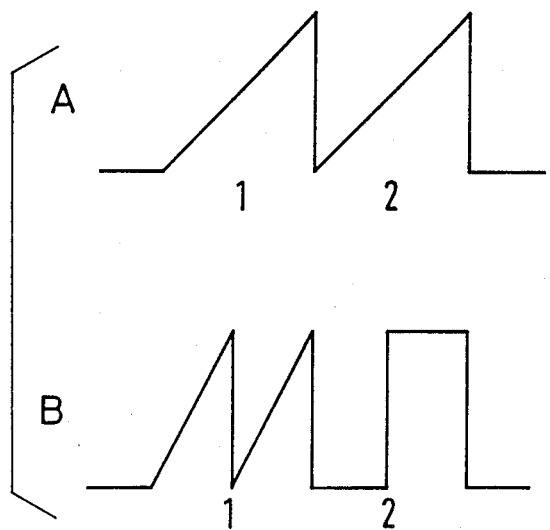
Figure 2:
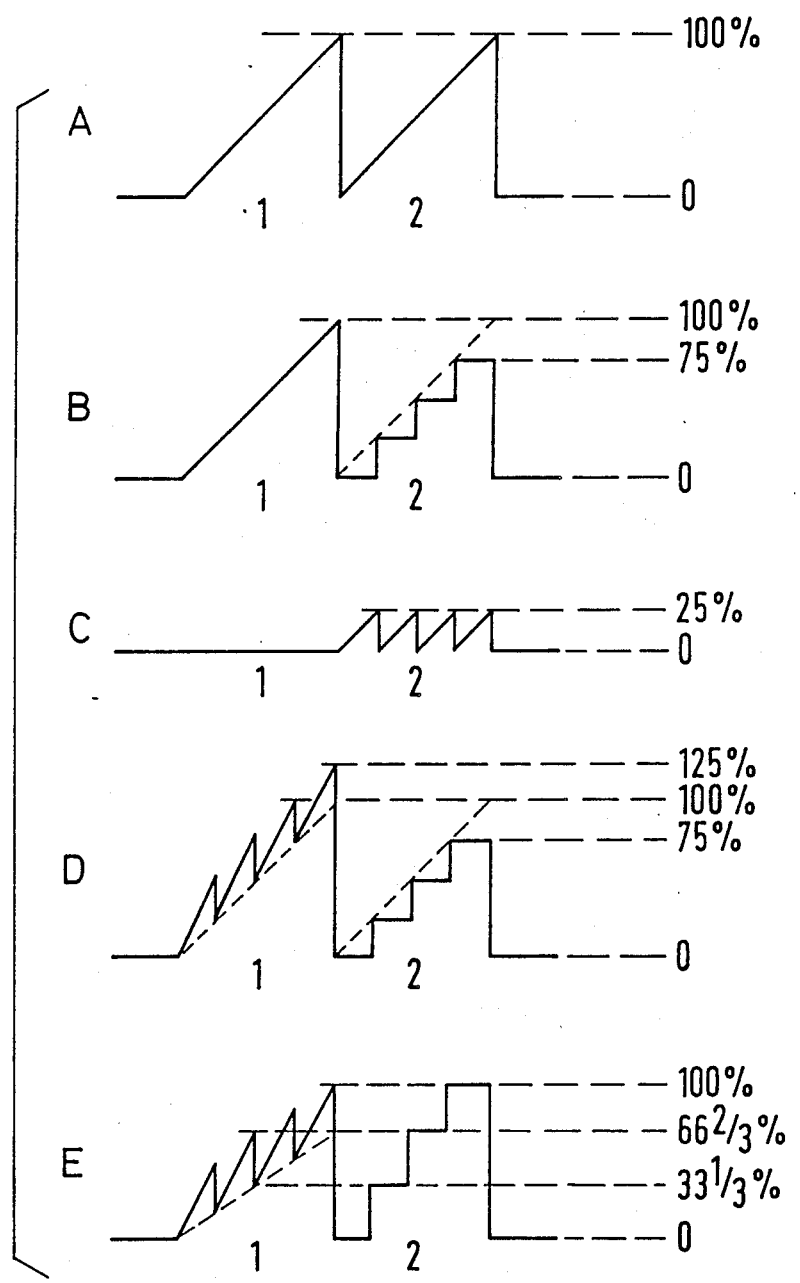

In the drawings:

FIG. 1 is a block schematic diagram of apparatus in accordance with the present invention, and FIGS. 2 and 3 show waveforms illustrating the operation of the present apparatus.

Referring to FIG. 1, apparatus for controlling the operation of a visual display unit of the cathode ray tube type includes an input 10 to which a conventional video signal is fed. The input 10 is connected to an analogue-to-digital converter 11 which in turn is connected to a store 12. The video signal at the input 10 is also fed to an adder 14 and to a subtraction circuit 15 which also receives the output of the analogue-to-digital converter via a digital-to-analogue converter 16. The output from the store 12 is fed to a digital-to-analogue converter 18 which is connected to a switch 20. The switch 20 can be operated to selectively feed the output of the circuit 18 or the output of the adder 14 to an output 22 to operate the display of the display unit.

The operation of the circuit of FIG. 1 will now be described with reference to FIGS. 2 and 3. In FIG. 2A there is shown a conventional video waveform A which is in the form of a sawtooth and represents a grey-scale signal extending over two time intervals 1 and 2. These time periods may be television picture periods, although this is not necessarily the case. Suppose that the video signal is available only during period 1 and ceases to exist after the commencement of period 2 although it is required to maintain the corresponding image on the cathode ray tube for the period 2, e.g. in order to provide a sufficiently long exposure for the image to be recorded on photographic material. In this situation it is necessary to store the signal which is present during period 1 in a store so that it can be repeated during a second and if necessary further periods.

The waveform B of FIG. 2 illustrates one way in which storing can be carried out by quantising the signal to four levels (this is very coarse quantisation and is simply used to illustrate the principles of the present technique), and clearly leads to errors in the absence of the correction. The waveform C of FIG. 2 represents the difference between waveforms A and B during the period 2, and is the necessary correction signal. This is simply the difference between the original signal and its quantised version. As will be seen below this correction signal can actually be made available during period 1 so that it can be added to the waveform A during that period. The result is represented by waveform D in FIG. 2, where the correction waveform C has been added to the original waveform. If linearity in the photographic exposure process is assumed the result of exposure of the material to waveform D will be identical to that achieved by waveform A because the errors in the exposure based upon the stored signal during period 2 are anticipated by the exposure based upon the corrected signal of period 1. However, the waveform D of FIG. 2 is not strictly acceptable because although 75% of the dynamic range is not exceeded during period 2 the presence of the correction signal has taken the period 1 signal 25% into overload. This can be corrected simply as illustrated in waveform E of FIG. 2 where the stored signal has been amplified by a factor 4/3 to occupy the full range available. It should be noted that the correction component must be amplified by the same factor and thus occupies one third of the signal range instead of one quarter. The remaining two thirds of the range is now available for a reduced amplitude live signal during period 1, but the total exposure is still the same as before.

Relating these waveforms now to the circuit of FIG. 1 the analogue-to-digital converter 11 is used to provide the coarsely quantised signal shown in period 2 of waveform B and this signal is stored in the store 12. The correction signal is generated by converting the digitised signal back to analogue form in the digital to analogue converter 16 and feeding that to the subtraction circuit 15 where that waveform is subtracted from the original video waveform at input 10. The correction signal (waveform C) then appears at the output of subtraction circuit 15 and is fed to one input of the adder circuit 14. Here it is added to the original video waveform to produce waveform D. Thus the output of the adder is the sum of the original video signal and the correction waveform. The switch 20 selects either the corrected signal (position 1) or the stored digital signal reconverted to analogue form by the digital-to-analogue converter 18. It should be noted that attenuators and/or gain controls, which are needed to correct the amplitude of the signals, are not shown on the drawing of FIG. 1.

It will be appreciated that the circuit of FIG. 1 enables the use of a considerably smaller capacity store than has been possible with the prior art arrangements. It also enables more economic analogue-to-digital converters to be used.

The photographic recording process is not in general linear although it has been assumed to be so for the purpose of the above description. It is often necessary to apply appropriate predistortions to the signal to be displayed in order to achieve a correct result. These predistortions are still necessary and can still be applied since 1. all the information necessary to define the appropriate values of the correction is available at the time of the first live exposure, and 2. there is still a one-to-one correspondence between each combination of signal value and the desired final exposure.

Where necessary curve shaping can be performed by means of a digital look-up table technique and the operation is somewhat simplifed because the coarsened digital signal can adopt fewer discrete values.

It should be noted that if the video signal at input 10 is already in digital form the analogue-to-digital converter 11 is not necessary. However, a truncation operation in its place merely ignoring the less-significant bits, will still permit storage economies to be made. In this case the adder 14 will be of digital form and the subtractor 15 is unnecessary since its outputs will consist always of the discarded less significant bits, which are available without computation. A digital-to-analogue converter is to be understood to be present at the output terminal instead of in the position shown. Full precision will be required of all units except the store if information is not to be lost, but major savings of storage are still possible.

It is not in principle necessary for any of the "live" signal components to be present during period 1; waveform B of FIG. 3 shows an extreme situation where the whole signal range during period 1 is devoted to the exposure of the correction signal; in this case only one bit of storage per picture element is required during period 2. (The waveform A of FIG. 3 shows the original signal for comparison). In this extreme case the analogue-to-digital converter 11 feeding the store can reduce to a single comparator and merely detects whether the signal value is above or below the midrange level. It should be noted that this also illustrates that should the comparator level drift no serious effect will result since the correction signal will compensate; this applies also to systems of greater numbers of bits provided that there is sufficient margin in the dynamic range available to accommodate the larger correction signals that result.

In situations where the stored information is to be used more than once (e.g. an eight-period exposure from one "live" period) the stored image must have sufficient precision to ensure that the "live" period can accommodate all the correction necessary for subsequent periods in which the signal is displayed from storage. The number n of bits stored per picture element must be such that $2^n \geq$ (total number of periods): beyond this point full correction cannot be maintained. Thus a 3-bit store will permit 8 periods of exposure, in which the first period is entirely devoted to correction, and each of the following 7 periods exposes the 3-bit digital signal.

In this specification the term "period" is intended to refer inter alia to a television line, field, or picture period, or any combination of these periods.

I claim:

1. Apparatus for controlling operation of a visual visual display unit from a video signal which is present only during a first period of time, such that an image corresponding to that signal can be displayed for one or more further such periods, said apparatus comprising storage means for storing digital signals representative of picture information to be displayed for one or more periods after that first period, and means for generating during the first period a correction signal which is arranged to compensate for any imprecision in the stored signal and which is combined with the video signal so that the display is driven by the combined signal in the first period.

2. Apparatus as claimed in claim 1, wherein the video signal is in analogue form and is fed to the storage means via an analogue-to-digital converter.

3. Apparatus as claimed in claim 2, wherein the means for generating the correction signal comprises a subtraction circuit which forms a signal representing the difference between the video signal and the analogue equivalent of the stored signal.

4. Apparatus as claimed in any preceding claim wherein the correction signal and the video signal are combined in an addition circuit.

5. A method of operating a visual display unit so that an image can be displayed for a period of time longer than that associated with the period for which the corresponding video signal normally exists, comprising storing a digital version of the video signal to be displayed, forming during a first period a correction signal which is arranged to compensate for imprecisions in the stored signal, combining the correction signal with the video signal and driving the display on the basis of the combined signal during said first period and on the basis of the stored signal during one or more further periods.

* * * * *